United States Patent [19]

Hasegawa et al.

[11] Patent Number: 4,492,771

[45] Date of Patent: Jan. 8, 1985

[54] PROCESS FOR PRODUCING CARBON MATERIAL FOR DE-SULFURIZATION FROM A BINDER WITH A BLEND OF NONCOKING AND COKING COAL

[75] Inventors: Takashi Hasegawa; Koji Tsuchihashi, both of Fukuoka; Hiroshi Yamashita, Kanagawa, all of Japan

[73] Assignee: Mitsubishi Chemical Industries Limited, Tokyo, Japan

[21] Appl. No.: 432,958

[22] PCT Filed: Jan. 26, 1982

[86] PCT No.: PCT/JP82/00024

§ 371 Date: Sep. 24, 1982

§ 102(e) Date: Sep. 24, 1982

[87] PCT Pub. No.: WO82/02537

PCT Pub. Date: Aug. 5, 1982

[30] Foreign Application Priority Data

Jan. 27, 1981 [JP] Japan .................................. 56-10688
Jan. 30, 1981 [JP] Japan .................................. 56-12337

[51] Int. Cl.³ ...................... C01B 31/10; C01B 31/08; C01B 31/02; B01J 20/20

[52] U.S. Cl. ..................................... 502/420; 55/73; 264/29.3; 264/29.7; 423/244; 502/413; 502/433; 502/435; 502/436

[58] Field of Search ............ 252/421, 444, 445, 411 S; 201/24, 6, 8; 264/29.7, 29.3; 502/413, 420, 433, 435, 436

[56] References Cited

U.S. PATENT DOCUMENTS

| | | | |
|---|---|---|---|
| 2,008,146 | 7/1935 | Morrell | 252/421 |
| 3,623,999 | 11/1971 | Jüngten et al. | 252/421 |
| 4,124,529 | 11/1978 | Jüngten et al. | 252/421 |
| 4,197,160 | 4/1980 | Degrave et al. | 201/6 |
| 4,202,734 | 5/1980 | Greenbaum | 201/24 |
| 4,233,117 | 11/1980 | Jüngten et al. | 201/6 |
| 4,318,779 | 3/1982 | Tsuyuguchi et al. | 201/24 |

*Primary Examiner*—P. E. Konopka
*Attorney, Agent, or Firm*—Oblon, Fisher, Spivak, McClelland & Maier

[57] ABSTRACT

Carbon material for de-sulfurization excellent in adsorptibility and mechanical strength can be produced from coal by controlling the physical properties of the raw material coal before its shaping to particular ranges, and subjecting the shaped coal to carbonization treatment.

10 Claims, No Drawings

PROCESS FOR PRODUCING CARBON MATERIAL FOR DE-SULFURIZATION FROM A BINDER WITH A BLEND OF NONCOKING AND COKING COAL

FIELD OF TECHNOLOGY

This invention relates to a process for producing carbon material for de-sulfurization with coal as the raw material. More particularly, it is concerned with a process for producing granular activated carbon excellent in adsorptibility and mechanical strength.

BACKGROUND OF TECHNOLOGY

In recent years, granular activated carbon produced from coal as the raw material has become used as the carbon material for removing sulfur from discharge gas from thermoelectric power plants, chemical plants, metal refineries, and others.

And, the de-sulfurizing operations of discharge gas with the activated carbon is classified into the so-called dry method and wet method. In either method, since adsorption and reproduction are repeatedly done over a long period of time, the activated carbon is required to have, along with its adsorptibility, various mechanical strength such as impact resistance strength, wear-resistance strength, and so forth.

In case, however, coal is used as the raw material, it is a general trend that, when the absorptibility is increased, the mechanical strength decreases, and, on the contrary, when the mechanical strength is to be increased, the adsorptibility is lost. Therefore, emergence of the carbon material for de-sulfurization excellent in its adsorptibility and mechanical strength has heretofore been desired.

Furthermore, the carbonization treatment of shaped raw material coal is done by heating the raw material to the ultimate temperature of approximately 600° to 1,000° C. using a heating furnace such as rotary kiln, fluidized bed, mobile bed, etc.. However, this treatment has shortcomings such that, depending on the manner of handling the raw material for the carbonization treatment, the shaped coal is subjected to crush and wear to cause poor rate of yield, and, further, the mechanical strength of the resulting carbon material is lowered because of such crush and wear. Such shortcomings are particularly remarkable when the rotary kiln is used as the heating furnace.

SUMMARY OF THE INVENTION

The object of the present invention is to provide the carbon material having large adsorptibility to oxides of sulfur, from coal as the raw material, without impairing the mechanical strength. The other object of the present invention is to provide a method capable of producing such carbon material with good rate of recovery.

And, such objects can be readily achieved in accordance with the present invention to be described hereinbelow.

In the following, the present invention will be explained in detail.

For non-coking coal to be used for the purpose of the present invention, there may be enumerated one or more than two kinds of lignite, brown coal, sub-bituminous coal, and anthracite having no coking property. For coking coal, there may be used one or more than two kinds of sub-bituminous coal and bituminous coal having slight coking property, weak coking property, or strong coking property. In particular, favorable results can be obtained when brown coal is used as the non-coking coal, and strongly coking bituminous coal as the coking coal. A blending ratio of the coking coal in the blended coal is at least a few percent by weight and above, usually 5% by weight or so and above, e.g., 15 to 60% by weight. These raw material coals are crushed either after the blending or before the blending. The degree of crushing should preferably be such that the entire raw material pass through a 60-mesh sieve, of which 40 to 70% by weight, or preferably 50 to 60% by weight be a 200-mesh under-sieve.

The mean reflecting power ($\bar{R}_o$) of the blended coal is a value calculated from a value of each simple coal measured in accordance with Japanese Industrial Standards (JIS) M8816, depending on the blending ratio. In the present invention, it is desirable that the blending ratio of the non-coking coal and the coking coal be so adjusted as to bring this value to a range of from 0.3 to 1.0, or preferably from 0.4 to 1.0. When the mean reflecting power ($\bar{R}_o$) is 1.0 and above, the absorptibility of the resulted carbon material to be oxides of sulfur lowers, which is not preferable.

For the binder, there is no particular limitation provided that it has appropriate fluidity and tackiness under the shaping conditions, and moreover it retains the shaped product in its designated shape even by high temperature calcination. Usually, there may be used one or more than two kinds of distilled residiuum of coal or petroleum series such as pitch, asphalt, etc., thermosetting resin such as phenol resin, urethane resin, etc., inorganic binder such as water glass, etc., and various other materials. The binder is added to the blended coal at dry standard in a range of from 5 to 50% by weight. Its adding quantity should desirably be adjusted such that the Gieseler maximum fluidity (GP-MF), the crucible swelling number (CSN) and the Roga-microstrength Index (RI) of a mixture after the binder has been added to the blended coal may fall under a range to be described later. Since these physical values are affected by the brand of coal and the kind of the binder, the adding quantity of the binder had better be found in advance based on experiments.

The Gieseler maximum fluidity (GP-MF) of the mixture is a value which is measured in accordance with the fluidity test method (Gieseler plastometer method) defined in JIS M8801. In the present invention, this value should desirably be adjusted in a range of from 0 to 3,000 DDPM, or preferably from 50 to 3,000 DDPM. When the Gieseler maximum fluidity (GP-MF) exceeds 3,000 DDPM, the adsorptibility of the resulted carbon material to the oxides of sulfur lowers unfavorably.

The crucible swelling number (CSN) of the mixture is a value which is measured in accordance with the gas heating method belonging to the crucible swelling method (coke button method) defined in JIS M8801. In the present invention, this value should desirably be adjusted to 0, ½, 1, 1½. or 2 When the index number becomes larger than 2½, the adsorptibility of the resulted carbon material to the oxides of sulfur lowers unfavorably.

The Roga-microstrength Index (RI) of the mixture is a value which is measured in the following manner.

That is to say, 5 g of a specimen is placed in a crucible of 30 ml capacity. After making its surface even and horizontal, a steel weight of 110 g is put on the specimen, and then a load of 6 kg is applied onto the weight by means of a compressing device to impart compressive force to the specimen for 30 seconds. Subsequently, the weight is taken away, and the crucible is covered with a lid, after which it is placed in a Muffle furnace maintained at a temperature of 850° ± 10° C. for calcination under heat for 15 minutes. After the calcined specimen has been cooled, it is taken out of the crucible, followed by quartering the same, and the total quantity of the quartered specimen is charged in an I-type drum (a cylindrical container of 25 m/m in diameter and 300 m/m in length, within which five pieces of steel balls of 10 m/m in diameter are placed). After the drum has been rotated for 100 times, the content is screened with a sieve of 1 m/m mesh, and the percent by weight of the over-sieve specimen is designated as the Roga-microstrength Index thereof.

In the present invention, it is desirable that the value of the Roga-microstrength Index (RI) to be measured in the above-described manner be adjusted in a range of from 10 to 95, or preferably from 30 to 95. When the Roga-microstrength Index (RI) does not reach a value of 10, the mechanical strength of the resulted carbon material is not sufficient, and, on the other hand, when the value exceeds 95, the adsorptibility of the carbon material to the oxides of sulfur lowers unfavorably.

The mixture which has been adjusted its physical property in the above-described manner is kneaded by a kneader, if necessary, and then shaped by a well known shaping means. Shaping of the mixture is done by means of a shaping machine such as, for example, briquetting machine, pelletizer, extrusion machine, rolling type granulating machine, and so forth, whereby the mixture is shaped into various shapes such as spherical shape, almond-shape, pillow-shape, column shape, and others having a diameter of from 3 to 100 m/m, or preferably from 5 to 50 m/m. The shaping is carried out at a temperature which does not cause substantial decomposition of the non-coking coal, e.g., usually at 250° C. in the case of brown coal.

The thus obtained shaped coal is usually subjected to the carbonization treatment by means of the rotary kiln, until it is heated to an elevated temperature of approximately 600° to 1,000° C.

For the rotary kiln, there may be used various types such as an internal heating type and an external heating type which introduce heating gas in the counter-current or concurrent direction with respect to the shaped coal, or a combination of the internal heating type and the external heating type, and so forth. In particular, the counter-current, internal heating type is used preferably.

In the present invention, it is desirable for the purpose of the abovementioned carbonization treatment that the initial temperature elevating rate, i.e., an average speed of temperature elevation until the temperature of the shaped coal reaches 400° C., be so adjusted as to be in a range from 15° to 120° C./min., or preferably from 20° to 110° C./min.. In so doing, the shape retaining property of the shaped coal becomes favorable in the treatment after the surface of the shaped coal has immediately undergone appropriate carbonization with the result that the carbon material for de-sulfurization, which is excellent in property, can be obtained under the conditions where the rate of crushing and wear of the raw material is extremely low. When the temperature elevating rate exceeds 120° C., there take place fusion, swelling, and deformation in the shaped coal, whereby the mechanical strength of the resulted coal lowers.

The adjustment of the abovementioned temperature elevating rate can be readily carried out by contacting the shaped coal with heating gas of from about 450° to 750° C. in the case of, for example, the internal heating type rotary kiln. When the heating gas exceeds 750° C., cracks tend to occur readily in the shaped coal, which is not favorable. By the way, such temperature elevating rate is unique with the present invention in view of the fact that a rate of from 0.5° to 5° C./min. is considered appropriate in the production of the activated carbon in general.

For the heating gas, there may usually be used combustion waste gases such as coke furnace gas, natural gas, oil gas, naphtha, and so forth. These gases should desirably contain oxygen gas at a ratio of 10% by volume or less, or perferably from 3 to 10% by volume. Moreover, when the carbonization treatment is to be conducted at a temperature of 700° C. and above, they should desirably contain water vapor at a ratio of from 20 to 80% by volume, or preferably from 40 to 60% by volume.

In this way, the temperature of the shaped coal in the rotary kiln is gradually elevated as it proceeds from the inlet end part of the kiln toward its outlet end part, and finally the shaped coal is elevated to a temperature of approximately 600° to 1,000° C. to be carbonized. As the method for maintaining the shaped coal at such high temperature, there is no necessity for taking any special measures in the case of using the internal heating type rotary kiln, in which the shaped coal is made to contact in counter-current with the above-mentioned oxygen containing heating gas at a temperature of about 450° to 750° C., because the heating gas temperature at the inlet end part of the rotary kiln having an ordinary length, i.e., the gas phase temperature of the shaped coal at the outlet end part thereof is determined to a range of from 600° to 1,000° C.; however, when use is made of, for example, the internal heating type rotary kiln, in which the shaped coal and the abovementioned heating gas are concurrently introduced thereinto, there is adopted a method of introducing a high temperature heating gas from a half way of the rotary kiln.

The carbonization treatment of the shaped coal is effected by keeping the shaped coal within the rotary kiln for a time period of from 2 to 8 hours in an ordinary case, or preferably from 4 to 6 hours. It is desirable that the resident time at a temperature level of 700° C. or so and above where the shaped coal brings about the water-gas reaction be set in a range of from 0.5 to 2 hours, or preferably from 1 to 1.5 hours.

In the foregoing, explanations have been giveín detail as to a case of using the rotary kiln for the carbonization treatment. However, the carbonization treatment can also be effected by use of a fixed bed, a fluidized bed, or a moving type bed such as Herreshoff furnace, or various other types of heating furnace. Incidentally, even in such case, it is desirable that the abovementioned particular temperature elevating rate be adopted and the heating gas at the above-mentioned particular temperature be used, until the temperature of the shaped coal reaches 400° C.

The thus obtained carbon material is subjected, if necessary, to further activating treatment with water vapor, etc., after which it is charged in an adsorption tower or vessel and used for de-sulfurization of waste gas in the form of the fixed bed or the fluidized bed.

The carbon material for de-sulfurization to be produced in accordance with the method of the present invention has large mechanical strength, while maintaining high adsorptibility to the oxides of sulfur, in spite of it being made of coal as the raw material, hence it is difficult to be reduced to powder even after repeated adsorption and reproduction operations over a long period of time, and is extremely useful as the carbon material for de-sulfurization.

Furthermore, according to the present invention, the carbonization treatment of the shaped coal can be done with good rate of recovery by adjusting the initial temperature elevating rate of the shaped coal to a particular range.

Accordingly, the process of the present invention is useful as the industrial process for producing the carbon material for desulfurization.

PREFERRED EMBODIMENT OF THE INVENTION

In the following, the present invention will further be explained in detail with reference to embodiments thereof.

Note should be taken that the tumbler coke strength and the $SO_2$ adsorptibility in the examples are measured by the undermentioned methods of measurement. Also, the temperature of the shaping coal at the outlet end part of the rotary kiln is substantially coincident with the gas phase temperature at that location, hence it is indicated as such.

Method of Measuring Tumbler Coke Strength 400 g of a specimen and 20 pieces of steel ball, each having a diameter of 14 m/m are placed in a drum having an inner diameter of 208 m/m and a length of 270 m/m, inside of which 8 lifter, each having a width of 25 m/m and a length of 270 m/m, are provided at an equal space interval therebetween, and the drum is rotated for 15 minutes at a speed of 40 rpm. Subsequently, the content, except for the steel balls, is screened with a sieve having a mesh interval of 6.73 m/m, and the percent by weight of the granular material on the sieve is determined to be the tumbler coke strength of the specimen.

Method of Measuring $SO_2$ Adsorptibility 25 ml of a specimen crushed to a size of 1 to 1.2 m/m is charged in a glass tube having an inner diameter of 21 m/m and in which a perforated plate for supporting the specimen is provided at the lower end part, and the glass tube is maintained at 125° C. Then, $SO_2$ containing gas consisting of 0.1% by volume of $SO_2$, 5% by volume of $O_2$, 10% by volume of moisture, and a remainder of $N_2$ is continuously supplied at a rate of 0.5 l (at 25° C.)/min. into the glass tube from the bottom thereof, and a time (hr.) taken until the $SO_2$ concentration in the gas led out of the top of the glass tube indicates 0.005% by volume is determined to be the $SO_2$ adsorptibility of the specimen.

EXAMPLE 1

Non-coking coal A (brown coal of $\overline{R}_o=0.4$), non-coking coal B (sub-bituminous coal of $\overline{R}_o=0.6$), coking coal C (bituminous coal of $\overline{R}_o=1.2$), and coking coal D (bituminous coal of $\overline{R}_o=1.0$) were blended at respective ratios as shown in the following Table, and then crushed by use of a ring roller mill in such a manner that the entire blend passes through a 60-mesh sieve, of which 50% by weight constitutes a 200-mesh undersieve. 90 parts by weight of the powdery coal blend thus obtained and 10 parts by weight of coal tar pitch (binder) were sufficiently mixed by use of a kneader.

The thus obtained mixture was measured for its Gieseler maximum fluidity (GP-MF), crucible swelling number (CSN) and Roga-microstrength Index (RI), the results of measurement being shown in Table 1 below.

The abovementioned mixture was shaped by use of the briquetting machine into an almond-shape of 15 m/m long, 10 m/m wide, and 7 m/m thick, after which the shaped product was subjected to the heat-treatment.

The heat-treatment was done by use of the internal heating type rotary kiln, wherein the shaped products were continuously introduced from one end of the kiln, while combustion waste gas from the coke furnace containing 3% by volume of oxygen and 45% by volume of water vapor was introduced from the other end thereof, and the maximum temperature of the shaped product in the kiln was maintained at 850° C. The heat-treated shaped products were continuously cooled and taken out of the other end of the kiln.

The tumbler coke strength and the $SO_2$ adsorptibility of the thus obtained carbon material were measured, the results of which are shown in Table 1 below.

For the sake of comparison, a carbon material was obtained by conducting the exactly same operations as in Example 1 above with the exception that the adding quantity of the coal tar pitch was reduced, and the Roga-microstrength Index of the mixture of the blended coal and the binder was made outside the range of the present invention. The results of measurement of the physical properties of the obtained carbon material are shown in Table 1 below in parallel with those of the present invention.

TABLE 1

| | Blending ratio (wt. %) | | | | Results of measurement | | | | |
| | Non-coking coal | | Coking coal | | Blended coal | Mixture | | | Carbon material | |
| | A | B | C | D | $\overline{R}_o$ | GP-MF | CSN | RI | Tumbler coke strength | $SO_2$ adsorptibility |
|---|---|---|---|---|---|---|---|---|---|---|
| Present invention | 62 | | 38 | | 0.70 | 1 | 1 | 40.4 | 86 | 12 |
| | | 85 | | 15 | 0.66 | 72 | 1 | 88.9 | 90 | 10 |
| Comparative Example | 88 | | 12 | | 0.50 | 0 | 0 | 2 | 3 | 12 |

EXAMPLE 2

The same treatments as in Example 1 above were conducted with the exception that, in the process of Example 1, the blending ratio of each coal and the ratio of use of the powdery blended coal and the binder were changed to modify the physical properties of the raw material coal before its shaping.

The results of measurement of the physical properties of the obtained carbon material are indicated in Table 2 below in parallel with the physical properties of the raw material coal. Incidentally, the shaped coal was prepared by mixing 85 parts by weight of the powdery blended coal and 15 parts by weight of coal-tar pitch (binder).

taken out, which maintains the original shape in the heat-treated product), the tumbler coke strength, and the $SO_2$ adsorptibility, the results of which are shown in Table 3 below.

For the sake of comparison, a carbon material was

TABLE 2

| | Blending ratio (wt. %) | | | | Results of measurement | | | | | |
|---|---|---|---|---|---|---|---|---|---|---|
| | Non-coking coal | | Coking coal | | Blended coal | Mixture | | | Carbon material | |
| | A | B | C | D | $\bar{R}_o$ | GP-MF | CSN | RI | Tumbler coke strength | $SO_2$ adsorptibility |
| Present invention | 46 | | 54 | | 0.83 | 2396 | 1½ | 93.8 | 96 | 9 |
| | | 68 | | 32 | 0.73 | 1065 | 1½ | 93.5 | 95 | 9 |
| | | 70 | 30 | | 0.82 | 1609 | 1½ | 92.2 | 96 | 8 |
| Comparative Example | | 5 | 95 | | 1.17 | 18197 | 7½ | 97.0 | 99 | 3 |

EXAMPLE 3

62 Parts by weight of brown coal having a mean reflecting power of 0.4 and 38 parts by weight of bituminous coal having a mean reflecting power ($\bar{R}_o$) of 1.2 were mixed, and the mixture was crushed by use of the ring roller mill in such a manner that the entire mixture passes through a 60-mesh sieve, of which 50% by weight constitutes a 200-mesh under-sieve. 90 Parts by weight of the powdery blended coal as obtained and 10 parts by weight of coal-tar pitch (binder) were sufficiently mixed by use of a kneader. The Gieseler maximum fluidity (GP-MF) of the thus obtained mixture was 1 DDPM, its crucible swelling number (CSN) was 1, and its Roga-microstrength Index (RI) was 40.4.

This mixture was shaped by use of a briquetting machine into an almond-shape of 15 m/m long, 10 m/m wide, and 7 m/m thick.

Subsequently, the carbonization treatment of the shaped coal as obtained was carried out by use of an internal heating type rotary kiln having an inner diameter of 2.5 m and a length of 21 m.

That is to say, shaped coal products were continuously introduced from one end of the kiln at a rate of 600 kg/hr., while combustion waste gas of the coke furnace gas containing 6% by volume of oxygen and 40% by volume of water vapor was continuously introduced from the other end thereof at a rate of 2,200 Nm³/hr., and the temperature in the rotary kiln and the temperature elevating rate (average temperature elevating speed until the temperature of the shaped coal reaches 400° C.) were maintained at respective temperatures as shown in Table below. The shaped coal as treated for carbonization was continuously cooled and taken out of the other end of the rotary kiln. Incidentally, the resident time of the shaped coal was approximately 4 hours.

The thus obtained carbon material was measured for its rate of yield (a ratio of the shaped product with respect to a quantity of the heat-treated product as obtained in exactly the same manner as in Example 3 above with the exception that the gas phase temperature of the shaped coal at the inlet end part of the rotary kiln and the temperature elevating rate of the shaped coal were made outside the range of the present invention. The rate of yield and the results of measurement of the physical properties of the carbon material as obtained are indicated in Table 3 in parallel with those of the present invention.

TABLE 3

| | In Rotary Kiln | | | Carbon Material | | |
|---|---|---|---|---|---|---|
| | Gas-Phase Temp. Max. at Inlet End Part for Shaped Coal (°C.) | Temp. of Shaped Coal at Outlet End Part Therefor (°C.) | Temp. Elevating Rate of Shaped Coal (°C./min.) | Rate of Yield (wt. %) | Tumbler Coke Strength | $SO_2$ Adsorptibility (hr.) |
| Present Invention | 500 | 850 | 20.3 | 88 | 90 | 11 |
| | 600 | 900 | 83.3 | 90 | 86 | 11 |
| Comparative Example | 350 | 850 | 7.3 | 60 | 50 | 7 |

INDUSTRIAL UTILITY

As stated in the foregoing, the process according to the present invention is useful as the process for producing from coal, with good rate of recovery, the carbon material for de-sulfurization which is excellent in the adsorptibility and mechanical strength.

We claim:

1. A process for producing a carbon material useful as an adsorbent for the desulfurization of discharge gases, comprising:
   (a) mixing a binder with a coal blend of a non-coking coal and a coking coal;
   (b) shaping said mixture into objects of a desired shape; and
   (c) carbonizing the shaped coal product by heating the same in the presence of a combustion waste gas atmosphere containing oxygen until said shaped coal mass attains an elevated temperature of 600° to 1000° C., said process being characterized by the fact that the blended coal materials of step (a) have a mean reflecting power ($\bar{R}_o$) of 0.3 to 1.0 and by the fact that the mixture of binder with blended coal material in step (a) has the following physical properties:
   (a) Gieseler maximum fluidity (GP-MF) to 0 to 3000 DDPM
   (b) Crucible swelling number (CSN) of 0, ½, 1, 1½ or 2
   (c) Roga-microstrength index (RI) of 10 to 95.

2. The process of claim 1 wherein, in said carbonization treatment, the increase in the temperature of the coal is initially elevated at a rate within the range of 15° to 120° C./min until the temperature of the shaped coal reaches 400° C.

3. The process of claim 2, wherein said temperature elevation rate of said coal ranges from 20° to 110° C./min.

4. The process of claim 2, wherein the average temperature elevating rate range specified in claim 2 is achieved by contacting said shaped coal material with said combustion waste gas at a temperature of about 450° to 750° C.

5. The process of claim 1 or 4, wherein said combustion waste gas atmosphere to which the shaped coal product is subjected during carbonization contains from 3 to 10% by volume oxygen.

6. The process of claim 1, 2 or 4, wherein said carbonization treatment is effected until the shaped coal product is elevated to a temperature within the range of 700° to 1000° C. by being subjected to a combustion waste gas atmosphere containing 3 to 10% by volume oxygen and 20 to 80% by volume water vapor.

7. The process of claim 1 or 2, wherein said carbonization of said shaped coal material is achieved by heating the shaped coal material in a counter-current, internal heating rotary kiln with a combustion waste gas comprised of 3 to 10% by volume oxygen and 20 to 80% by volume water vapor which is supplied to said kiln at a rate of 1 to 10 Nm$^3$/hr per 1 kg of shaped coal material fed into said rotary kiln, the gas phase temperature at the inlet of said rotary kiln being maintained at 450° to 750° C. and the gas phase temperature at the outlet of said rotary kiln being maintained at 700° to 1000° C.

8. The process of claim 1, 2 or 4, wherein said non-coking coal is brown coal.

9. The process of claim 8, wherein said coking coal is highly coking bituminous coal.

10. A process for producing a carbon material useful as an adsorbent for the desulfurization of discharge gases, comprising:

(a) mixing a binder selected from the group consisting of a coal or petroleum distilled residiuum, a thermosetting resin and an inorganic binder with a coal blend of a non-coking coal and a coking coal;

(b) shaping said mixture into objects of a desired shape; and (c) carbonizing the shaped coal product by heating the same in the presence of a combustion waste gas atmosphere containing oxygen until an elevated temperature of 600° to 1000° C. is reached, said process being characterized by the fact that the blended coal materials of step (a) have a mean reflecting power ($\overline{R}_o$) of 0.3 to 1.0 and by the fact that the mixture of binder with blended coal material in step (a) is characterized by the following physical properties:

(a) Gieseler maximum fluidity (GP-MF) of 0 to 3000 DDPM (b) Crucible swelling number (CSN) of 0, ½, 1, 1½ or 2

(c) Roga-microstrength index (RI) of 10 to 95.

* * * * *